INVENTORS,
PAUL H. BOTTOMS,
ROBERT J. CLAPP,
REUBEN H. LOGGINS,
JOHN G. STANSBURY
BY Lyon & Lyon
ATTORNEYS INVENTORS,
PAUL H. BOTTOMS,
ROBERT J. CLAPP,
REUBEN H. LOGGINS,
JOHN G. STANSBURY
BY Lyon & Lyon
ATTORNEYS INVENTORS,
PAUL H. BOTTOMS,
ROBERT J. CLAPP,
REUBEN H. LOGGINS,
JOHN G. STANSBURY
BY Lyon & Lyon
ATTORNEYS INVENTORS,
PAUL H. BOTTOMS,
ROBERT J. CLAPP,
REUBEN H. LOGGINS,
JOHN G. STANSBURY BY Lyon & Lyon
ATTORNEYS INVENTORS,
PAUL H. BOTTOMS,
ROBERT J. CLAPP,
REUBEN H. LOGGINS,
JOHN G. STANSBURY BY Lyon & Lyon
ATTORNEYS INVENTORS,
PAUL H. BOTTOMS,
ROBERT J. CLAPP,
REUBEN H. LOGGINS,
JOHN G. STANSBURY
BY Lyon & Lyon
ATTORNEYS INVENTORS,
PAUL H. BOTTOMS,
ROBERT J. CLAPP,
REUBEN H. LOGGINS,
JOHN G. STANSBURY
BY Lyon & Lyon
ATTORNEYS United States Patent Office Re. 24,978
Reissued May 2, 1961

24,978

METHOD AND APPARATUS FOR STRETCHING THERMOPLASTIC SHEET MATERIAL

Paul H. Bottoms, Hollywood, Robert J. Clapp and Reuben H. Loggins, Downey, and John G. Stansbury, La Canada, Calif., assignors to Swedlow Inc., a corporation of California Original No. 2,918,696, dated Dec. 29, 1959, Ser. No. 600,281, July 26, 1956. Application for reissue Oct. 21, 1960, Ser. No. 64,232

6 Claims. (Cl. 18—1)

Matter enclosed in heavy brackets [ ] appears in the original patent but forms no part of this reissue specification; matter printed in italics indicates the additions made by reissue.

This invention relates to the fabrication of plastics in sheet form and has particular reference to a process and apparatus for stretching thermoplastic sheet material.

One of the principal objects of this invention is to provide a novel process and apparatus for stretching thermoplastic sheet material to produce sheet stock of improved physical properties and, in the case of transparent sheet stock, of improved optical properties.

It has long been recognized in the art that certain thermoplastic materials develop improved physical properties such as resistance to fracture propagation, resistance to craze induced either by solvent application or by physical strain, and resistance to notch sensitivity, in those areas wherein the original sheet was stretched very greatly to arrive at a predetermined contour or configuration. Thus, when a hemispherical contour is formed such as by locating a hot, flat cast thermoplastic sheet in a fixture and blowing it to a dome-shape, then cooling to maintain configuration, the apex of the dome rarely propagates fracture, solvent or stress craze, nor is it sensitive to notching effect in the same degree as the original sheet. On the other hand, the base of such a dome, being stretched a relatively minor amount, does propagate fracture readily, it solvent- or stress-crazes easily and it is sensitive to notching effects in the same order of magnitude as the original cast sheet material.

Another object of this invention is, therefore, to provide a method and apparatus for mechanically stretching thermoplastic sheets so that the entire parts fabricated from such stretched sheets will have the same physical advantages as has been previously available only in limited sections of certain deeply formed parts or articles.

It is another object of this invention to provide a process and apparatus for uniformly stretching thermoplastic sheet material.

Other objects and advantages of this invention, it is believed, will be readily apparent from the following detailed description of preferred embodiments thereof when read in connection with the accompanying drawings.

Figure 1:
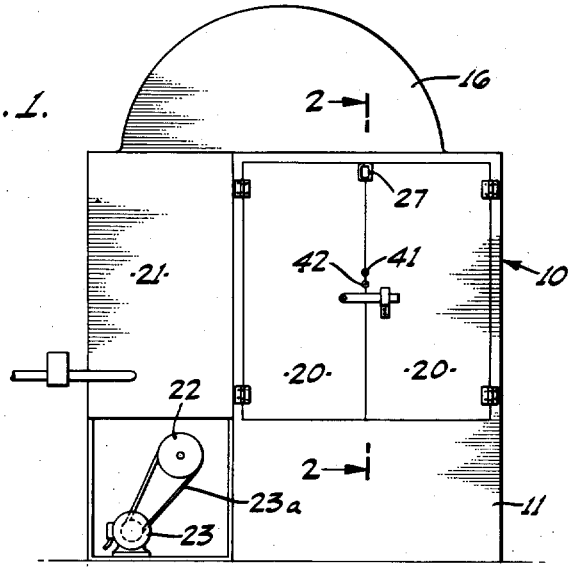
Figure 1 is a front elevation of an oven used in heating the sheet material in accordance with the process of this invention.
Figure 2:
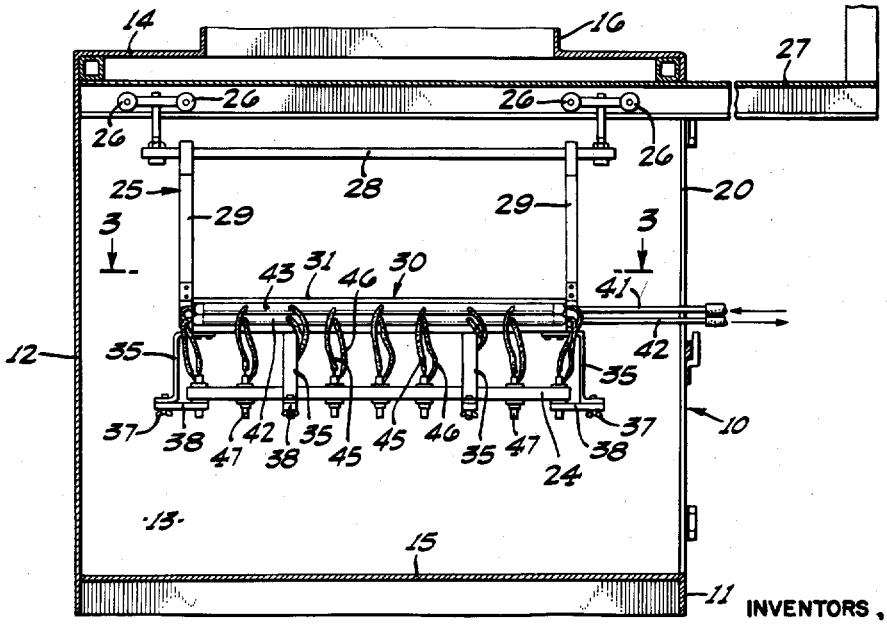
Figure 2 is a sectional view taken substantially on the line 2—2 of Figure 1.
Figure 3:
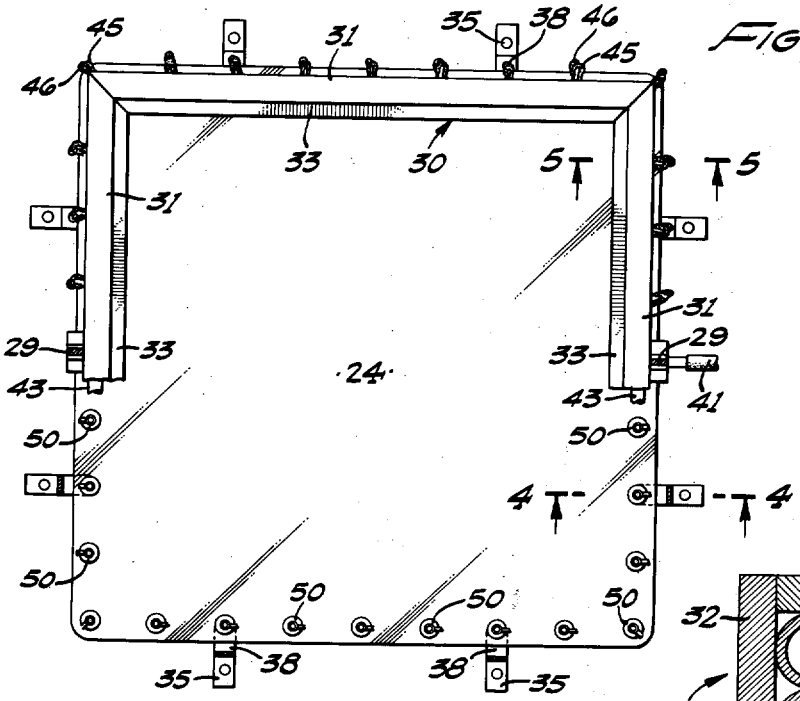
Figure 3 is a sectional elevation taken substantially on the line 3—3 of Figure 2.
Figure 6:
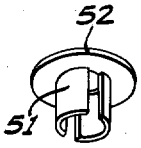
Figure 6 is a perspective view of an expansion spring clip utilized as a part of the supporting mechanism for the sheet during the heating operation.
Figure 5:
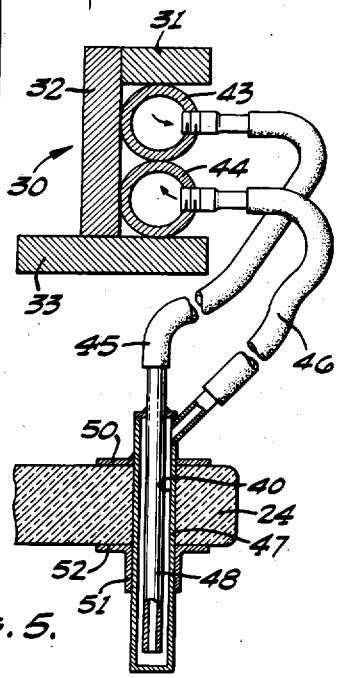
Figure 5 is an enlarged sectional view taken substantially on the line 5—5 of Figure 3.
Figure 4:
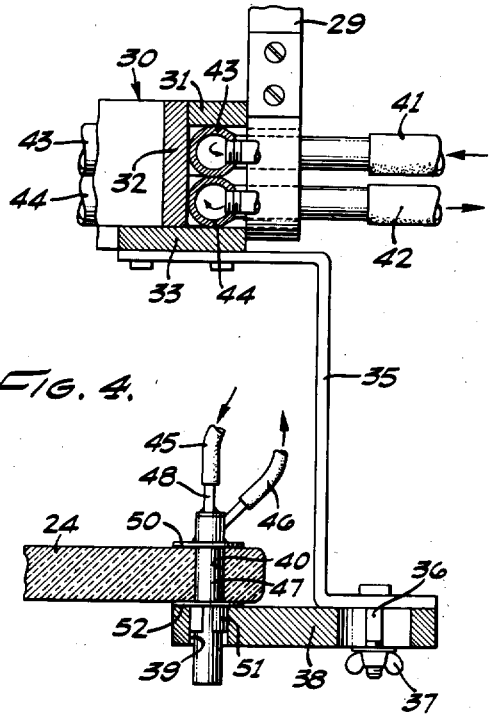
Figure 4 is an enlarged sectional view taken substantially on the line 4—4 of Figure 3.
Figure 7:
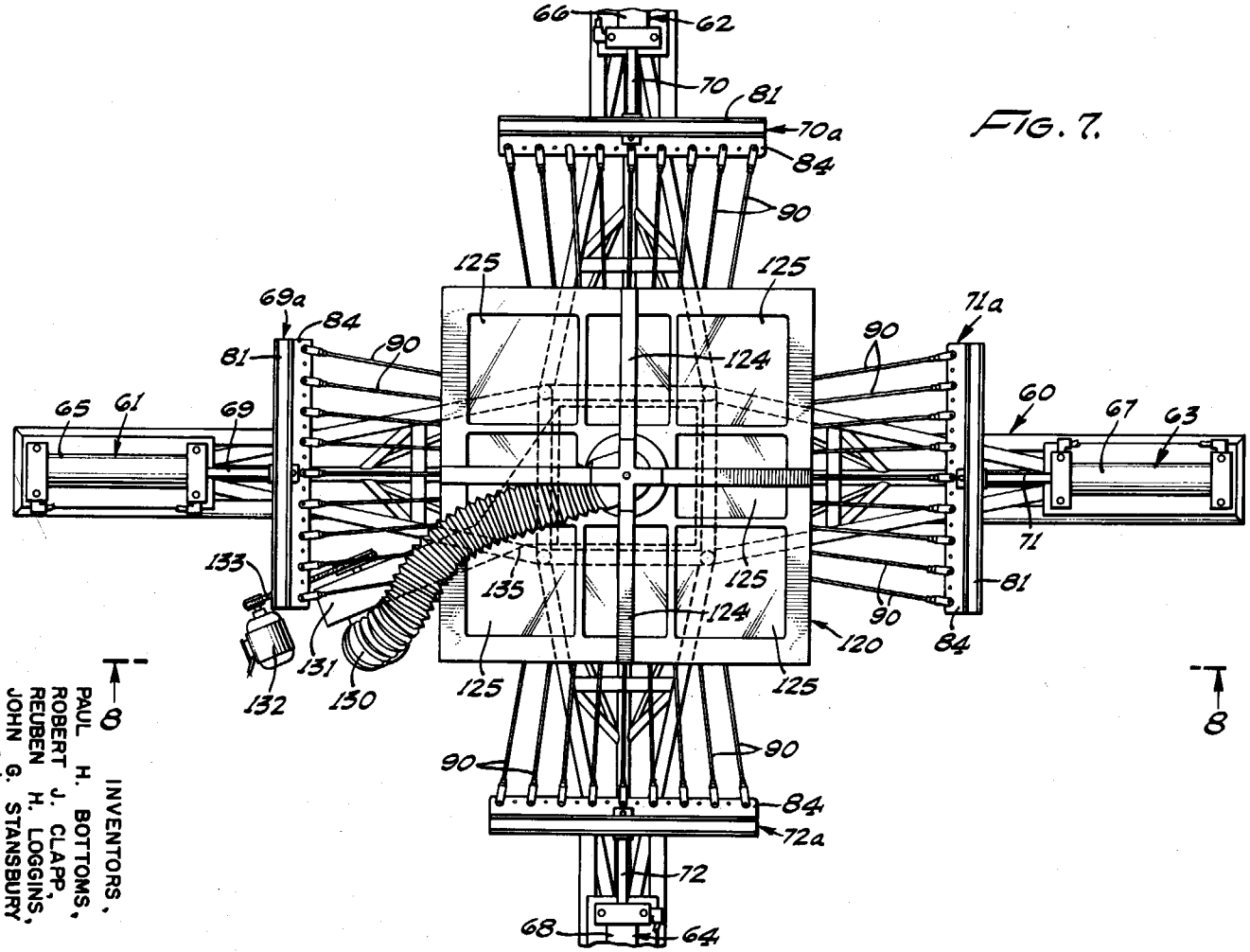
Figure 7 is a top plan view of the stretching apparatus.
Figure 8:
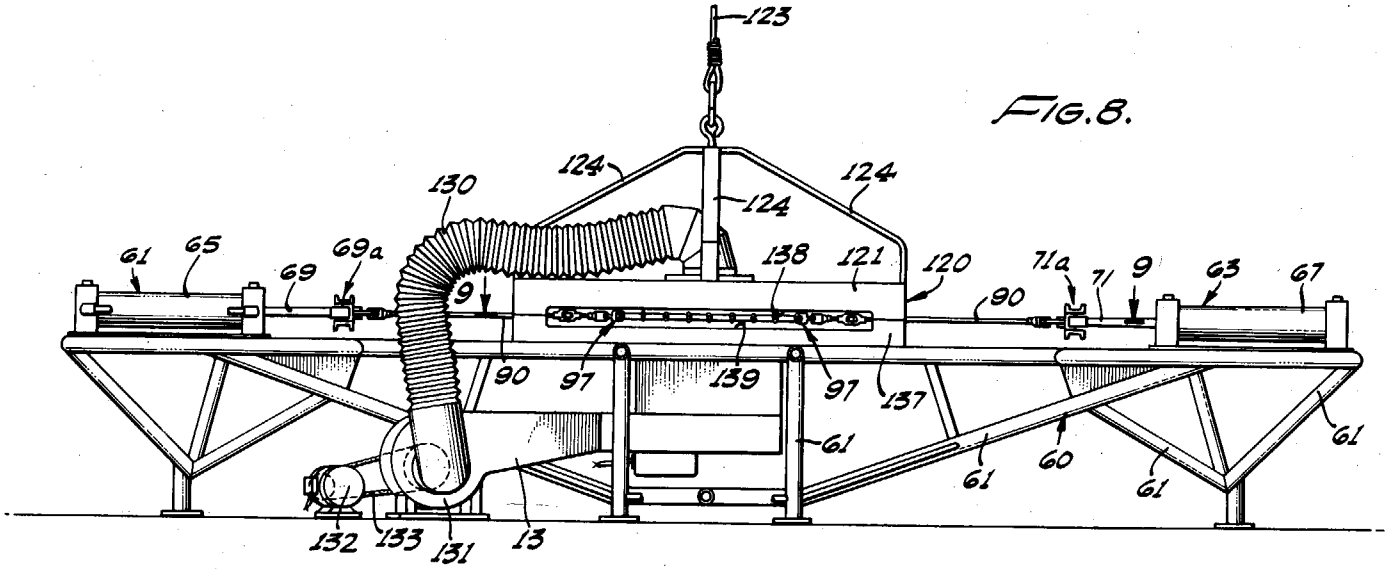
Figure 8 is a sectional view taken substantially on the line 8—8 of Figure 7.

In carrying out the process of this invention, the thermoplastic sheet material is first preheated to a temperature sufficient to permit the mechanical stretching operation to be carried out, i.e., to a temperature within the forming temperature range of the particular resin involved.

The preheating step is preferably carried out in an oven, and the thermoplastic sheet, prepared as described below, is set into the heating area of the oven in such a manner that it can uniformly absorb the heat from the re-circulated air. The heating medium is critical in that it must be capable of uniformly heating the sheet except those areas which, as described below, are specifically prevented from absorbing heat. Although it is preferred to utilize air as the heat transfer medium, small parts, and in some cases large parts, may advantageously be heated in a fluid bath of oil, glycerin, or some similarly good heat transfer medium which is not deleterious to the thermoplastic sheet involved, or with infra-red heaters.

The heating cycle is extremely critical in that the thermoplastic sheet must be heated evenly throughout its width, breadth and thickness, except only the areas specifically maintained as "cold islands" for gripping purposes, as described hereinafter. The rate of heat transfer in air ovens depends upon the velocity of air travel and the size of the plastic sheet in relation to the main heating cavity of the oven, the tendency of the sheet to baffle the normal flow of air in the heating cavity and the temperature differential between the air and the sheet to be heated. Typical forced circulation air ovens, when operated at approximately 10% greater temperature than the optimum stretching temperature for a given thermoplastic sheet, will heat the sheet evenly if the sheet is well positioned to prevent baffling of the air flow and allow even passage of hot air or both sides of the sheet. The approximate time required is one minute for each ten thousandth of an inch in thickness. As an example, polymethylmethacrylate sheet may be said to stretch best at 300° F. A circulating air oven would then be adjusted to control at 330° F. to heat such material. A sheet of polymethylmethacrylate ¾ of an inch thick ideally located in a hot forced air oven would require approximately 75 minutes to heat evenly by the formula stated above. This type of estimation is indicative of the time required, but must be checked for each individual part and size in each individual oven due to variations which are typical in heat ovens and the variations within any given oven due to difference in baffling and air flow characteristics within an oven induced by each different size and thickness of specific blanks heated. The heating cycle, therefore, though extremely critical cannot be arbitrarily forecast for all types of heating equipment as universally satisfactory for all types, sizes and thicknesses of blank stock, but must be individually determined by actual practice.

Following the heating step, the sheet is placed in the stretching apparatus. The primary purpose of the stretching equipment is to induce controlled elongation on both major axes of the sheet (assuming a rectangular or square sheet). Since the mass or volume of the thermoplastic sheet will be essentially unaffected by the stretching operation, the increase in length and width thus induced wil be at the expense of its thickness. Any equipment to induce this physical change requires three major components plus certain optional accessory items. The three major components are: a source of force to induce the elongation; a mechanism to transmit this force into its proper lines; and finally a mechanism to grip the sheet which is capable of moving simultaneously on both axes of stretch.

The source of force may be obtained from hydraulic pistons, air driven pistons, screws, a power windlass or capstan or the like. Since the sheet must be stretched on both axes, at least two sources of force are required. If two sources are used, located at 90° to each other, each must be coordinated with an additional mechanism directly opposite it to permit and induce lateral movement on the static edge. If four sources are used, opposite sources lending opposing force through the sheet must be coordinated. The source of force to induce the stretching motion must be controllable as to both the extent of movement and its rate of movement. We have found that typical rates are from 24 to 36 inches per minute but stretching may be accomplished successfully anywhere in the range from one inch per minute to 72 inches per minute.

The mechanism or means for transmitting the moving force to the sheet in such a way that the sheet is stretched evenly on both axes most advantageously takes the form of spreader bars and cables, although other mechanism such as lazy tongs, rods or bars may be used.

The third major component is a grip between the sheet to be stretched and the mechanism transmitting the moving force. The means for gripping to mechanically stretch the heated sheet is extremely important and may be accomplished in several ways. One method of gripping is with mechanical clamps of the eccentric closure type wherein the grip continues to hold and grip tightly as the sheet thins during the stretching operation. Mechanical grips of this general type must be serrated to prevent slippage on the sheet and must be radiused in the areas where they leave the plane of the sheet to prevent fracturing, tearing or notching. The mechanically simplest and preferred method of gripping the sheet to be stretched is a modification of the use of a multiplicity of clevis-like mechanisms attached to the cables and loading the sheet in bearing on holes drilled along the outer edges of the sheet. It has been found that any successful method of gripping requires careful control of the temperature at the location of grip as related to the temperature in the sheet proper.

In utilizing the preferred method of gripping described above, the sheet to be stretched is trimmed to its blank square or rectangular size and holes are drilled for the clevis-like grips before the sheet is located in the heating fixture. In the use of bearing holes, it is extremely important that the base plastic immediately around the hole be heated sufficiently to prevent brittleness of the material during the stretching operation, but not heated sufficiently to allow undue distortion, elongation or stretch at the hole. This relatively "cold island" then serves as a bearing area in the relatively hot sheet. To prevent a shearing action around the cold island there must be a thermal gradient area between the island and the relatively hot sheet. The temperatures of these various locations are dependent on the size of the hole, the thickness of the sheet, the edge distance, and the type of thermoplastic material being stretched, each type requiring different optimum stretching temperatures. The "cold island" technique is also contemplated if the eccentric type of mechanical clamp is utilized.

Accessory equipment to the main stretching mechanism includes equipment to maintain the sheet at stretching temperature during the stretching cycle. This may consist of a re-circulating hot air system which may enclose the area including the sheet being stretched. Where stretching rates are moderately high and the thermoplastic material involved is relatively thick, such accessory equipment may be entirely dispensed with or temperature may be maintained successfully simply by the use of heat reflective material such as aluminum foil, reflective aluminum paint and the like on surfaces immediately above and immediately below the sheet of transparent material being stretched. In this case, the reflector is used to redirect the heat being lost from the sheet back into the sheet.

Another accessory operation immediately following the stretching operation and preceding the cooling of the sheet being stretched may include the use of preheated dies brought into contact with the hot stretched sheet to induce it to form to a desired end configuration before it cools to maintain its stretched condition and the configuration so induced. Also the clamping of a periphtween the seal and the form tool will permit the use of ween the seal and the form tool will permit the use of vacuum or air pressure to form the sheet as a diaphragm before it cools to set its configuration and maintain its stretched condition.

Another operation required in the successful stretching of sheet is to permit the stretching force to relax during the cooling cycle an amount equivalent to the shrinkage induced by the coefficient of thermal expansion for the material involved through the temperature range that such material must cool from stretching temperature to ambient conditions. However, in no case should the relaxation of the stretching force be sufficient to permit mechanical shrinkage of the stretched sheet due to its natural tendency to return to its original as-cast dimensions.

Referring now to the drawings, the preferred apparatus of this invention includes a forced circulation air oven generally indicated 10 having front and rear walls 11 and 12, side walls 13, and top and bottom walls 14 and 15, including a recirculation stack 16. The front wall 11 is provided with double doors 20. A heating unit is housed within the portion of the oven indicated 21 and the heated air is circulated by means of a blower 22 driven by a motor 23 through a suitable transmission 23a.

Means are provided for properly supporting in the oven a plastic sheet 24 to be stretched. As shown in Figures 2–6, these means may include a support frame 25 which is suspended from rollers 26 riding on a track 27 mounted adjacent the top of the oven, the track extending outwardly therefrom for moving the frame and its contents into and out of the oven through the doors 20. The support frame comprises horizontal members 28 and vertical members 29 depending therefrom. Carried by the vertical members 29 is a rectangular, horizontal sub-frame 30 comprising a plurality of wood members 31, 32 and 33. These members form an insulating enclosure for the manifolds 43 and 44. Depending from the bars 33 is a plurality of bracket-bars 35 to which are attached, by means of bolts 36 and wing nuts 37, support plate members 38, each provided with an aperture 39.

Prior to mounting the plastic sheet 24 in the support frame 25, the flat sheet is cut to the desired blank size and drilled with a plurality of spaced grip holes 40 adjacent the periphery thereof.

Means are provided for cooling the area of the plastic surrounding the holes 40 during the heating operation. As shown in the drawings, these means may include coolant inlet and outlet main lines 41 and 42 leading to and from coolant manifolds 43 and 44 respectively, the manifolds being secured to the sub-frame 30 between the bars 31 and 32. Individual coolant inlet and outlet lines 45 and 46, preferably of flexible tubing, lead from the manifolds to individual coolant tubes 47, one for each grip hole 40. As shown best in Figure 5, each tube 47 contains a central, open-ended tube 48 through which the coolant is fed to be discharged upwardly through the annular space between the two tubes and thence to the outlet line 46, manifold 44 and main outlet line 42. The coolant tubes are each provided with a flange member 50 on the upper portion thereof, the flange member seating against the top surface of the plastic sheet 24 when the sheet is installed in the frame as shown in the drawings. A spring clip element 51 having a flange 52 surrounds each of the tubes 47 and are maintained in the apertures 39 of the support plate members 38. It will thus be understood that as coolant fluid is circulated through the coolant tubes 47, it will remove heat therefrom, from the flanges 50 and 52 and hence also from the area of the plastic sheet surrounding the holes 40. The main inlet and outlet lines 41 and 42 lead away from and to a coolant surge tank (not shown) positioned exteriorly of the oven and provided with a suitable pump and temperature control means (also not shown). If desired, the inlet line 41 may lead away from a tap water faucet and the line 42 may lead to a drain.

From the description thus far it will be understood that in addition to functioning as a means for controlling the temperature in the vicinity of the grip holes 40, the coolant tubes 47 also serve to lock the plastic sheet 24 in place upon the support plate members 38.

In operation of the apparatus described thus far and in carrying out the process of this invention, the sheet 24 is mounted as shown, with the frame 25 positioned outside the oven 10. The frame and its load are then rolled into the oven and the sheet heated under optimum conditions of time and temperature for the particular thermoplastic material being operated upon. During the heating cycle, coolant fluid is circulated from the exterior source of supply through the inlet line 41, manifold 43 and flexible lines 45 to the coolant tubes 47, thence back through the lines 46, manifold 44 and outlet line 42.

Following the heating cycle, the sheet and supporting frame are rolled out of the oven and the hot sheet removed from the frame by first lifting out the coolant tubes 47. The hot sheet is then immediately placed in the stretching apparatus described below.

The stretching apparatus, illustrated in Figures 7–13, includes a rigid framework, generally indicated 60, made up of a plurality of tubular members 61 suitably designed to resist the considerable forces generated by the apparatus.

Figure 17:
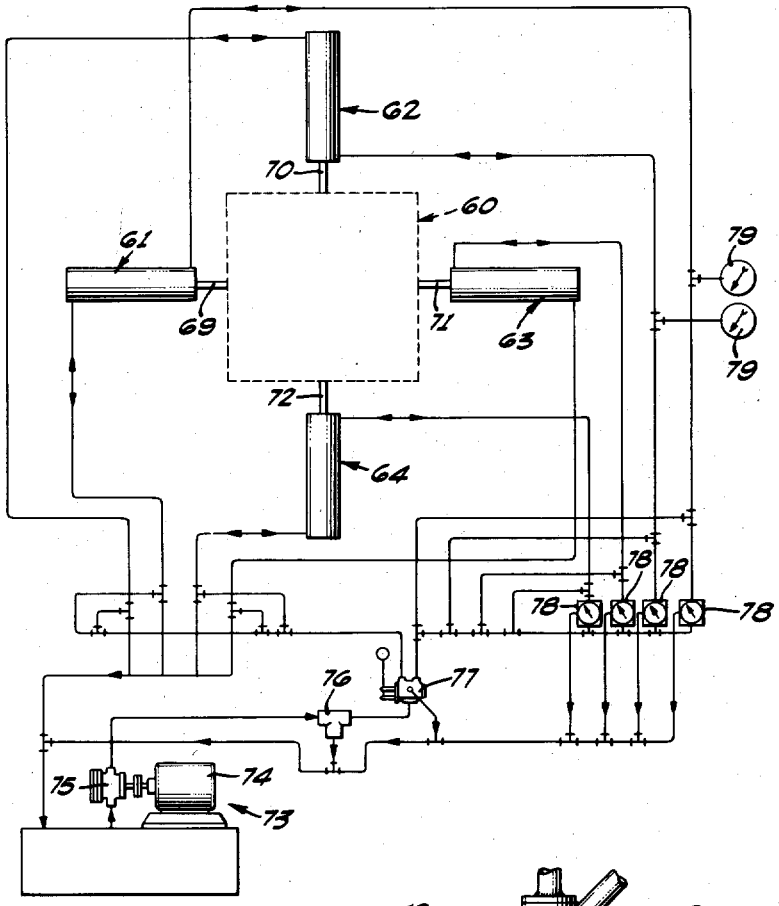
Figure 17 is a schematic diagram of the hydraulic system for the stretching apparatus.

Mounted on the framework 60 are four power cylinder assemblies 61, 62, 63, and 64, spaced 90° apart in mutually opposed and aligned pairs consisting of assemblies 61 and 63 and assemblies 62 and 64. The respective power cylinder assemblies include hydraulic cylinders 65, 66, 67 and 68, and piston rods 69, 70, 71 and 72. Figure 17 is a schematic diagram of the hydraulic system which includes a hydraulic power unit 73 comprising a motor 74 and pump 75, pressure relief valve 76, manual 4-way valve 77, for individual flow control valves 78, pressure gauges 79, and suitable hydraulic piping as shown.

Means are provided for transmitting the force of the power cylinder assemblies to the sheet to be stretched. As shown in the drawings, each of the piston rods 69, 70, 71 and 72 carries at the end thereof a spreader bar assembly 69a, 70a, 71a and 72a. Each bar assembly is identical, being made up of three channel beam members 81, 82 and 83 welded together, and a plate 84. A coupling member 85 is secured to the end of each piston rod and the coupling members are each provided with a slot 86 in which the respective plate 84 is received, a pin 87 securing the plate and, in turn, the entire spreader bar assembly to its respective coupling member 85.

A plurality of cables 90 are provided, one set for each spreader bar assembly, the cables each being provided at the aft end with a clevis member 91 for attachment of the cables in suitable holes 92 provided in the plates 84. The other ends of the cables are provided with turnbuckles 93, each of the turnbuckles, with the exception of the outer pair thereof of each set, having at the end thereof a clevis 94 attached to a coupling plate 95 by means of a pin 96. The other end of the coupling plate is secured to a sheet grip assembly 97 comprising a pair of plates 98 and 99 secured together in spaced relation by means of spacers 100 and nut and bolt assemblies 101, the latter also securing the sheet grip assembly to the coupling plate. A clevis pin 102 completes each of the grip assemblies. The sheet grip assemblies 105 for the sheet corners are similar to the assemblies 97, having pins 106, a pair of spaced plates 107 and nut and bolt assemblies 108, but are provided with a coupling plate 109 receiving two pins 110 for attachment of the two adjacent clevises 94 of the outer turnbuckles 93. This means of corner gripping results in the application of forces diagonally of the sheet, providing for even stretching of the corner areas and as such is an important feature of the invention.

Means are provided for maintaining heat in the thermoplastic sheet during the stretching operation and, as shown in the drawings, these means may include a recirculating air oven, generally indicated 120 and including a hood 121 which is bodily removable from the apparatus by means of a power lifting unit (not shown) operating through a cable 123 and a suitable yoke framework 124. The top of the hood is preferably provided with transparent window portions 125 to permit visual observation of the sheet 24 during the stretching operation. A flexible air outlet line 130 leads from the hood to a blower unit 131 which is driven by a motor 132 through transmission 133. The blower outlet duct 135, having an outlet end 136, leads to a collection chamber 137 provided below the hood 121, the chamber and the hood forming an enclosure around the sheet 24. Heat sources, such as infra-red ray heaters (not shown) are located in the collection chamber and return duct. Suitable openings 138 and 139 are provided in the hood and collection chamber for the cables 90.

Continuing now with the description of the process and the operation of the stretching apparatus, the hood 121 is removed and the hot sheet 24 from the oven 10 is placed in the position shown in Figures 7–10, with a grip assembly 97 at each interior hole 40 and a grip assembly 105 at each corner hole 40. The hood is then replaced and the hydraulic system is actuated to cause piston rods 69, 70, 71 and 72 to move under the hydraulic pressure in the respective cylinders, in a direction away from the sheet 24. As the piston rods move back, they draw with them the connected spreader bar assemblies and cables, stretching the sheet evenly on its two major axes.

The hydraulic pressure required for any specific sheet of thermoplastic material is predetermined, based upon the material involved, thickness, and the temperature of the sheet. The rate of stretching may be varied by varying the hydraulic pressure through manipulation of the valves or with the use of orifices (not shown) in the system.

After the travel of the pistons has been arrested by stops (not shown) and the sheet has been evenly stretched, the sheet is caused to cool evenly. As the sheet drops below its range of thermoplasticity, the hydraulic pressure is reduced to permit the sheet to thermally contract without fracture.

Figure 15:
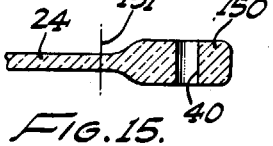
Figure 15 is a sectional view taken substantially on the line 15—15 of Figure 14.
Figure 16:
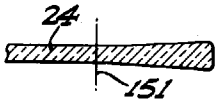
Figure 16 is a sectional view taken substantially on the line 16—16 of Figure 14.
Figure 14:
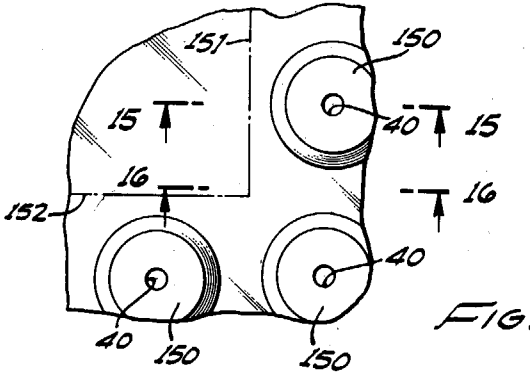
Figure 14 is a fragmentary top plan view of the corner of a stretched sheet prior to edge trimming the same.
Figure 9:
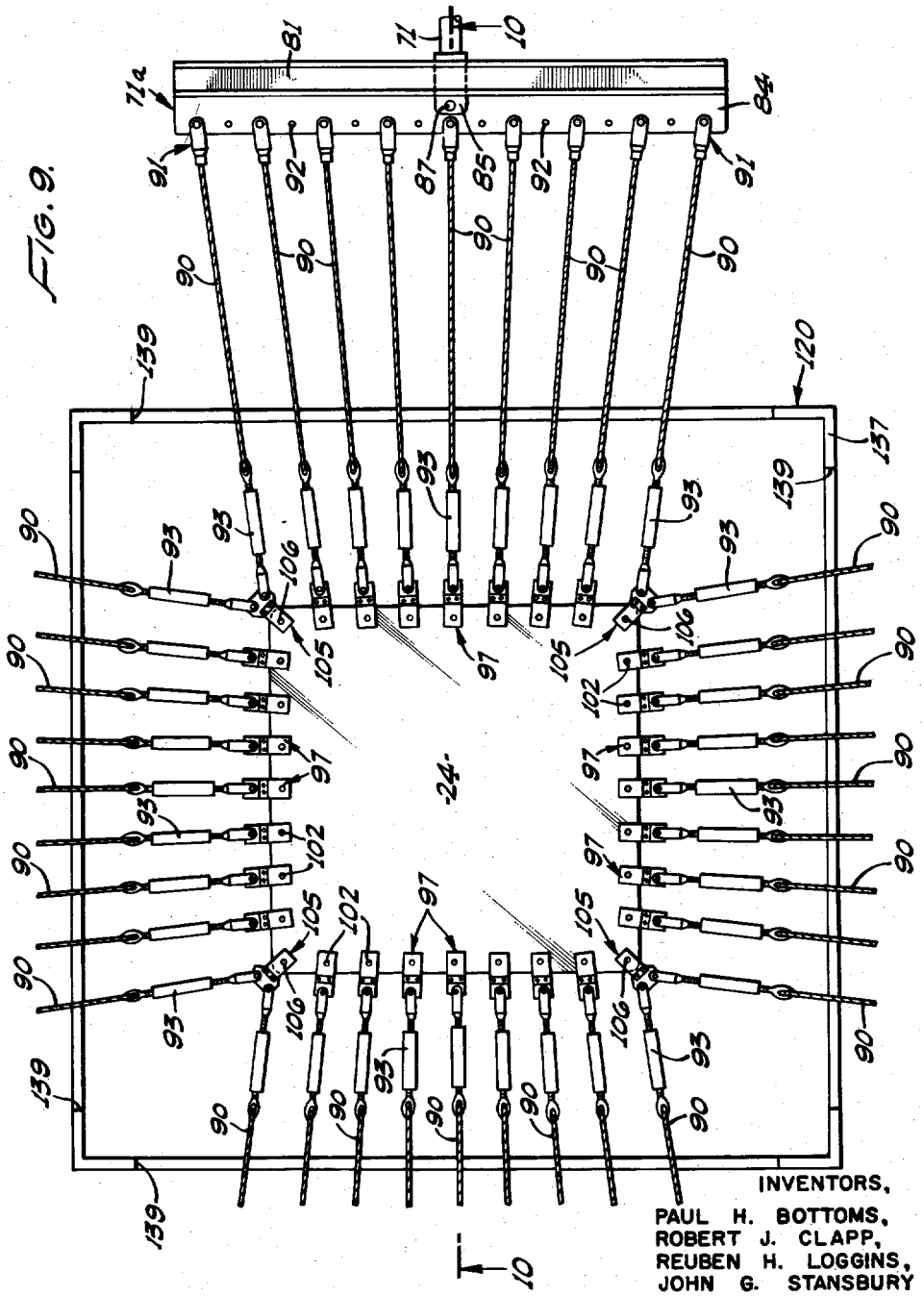
Figure 9 is an enlarged sectional view taken substantially on the line 9—9 of Figure 8.
Figure 10:
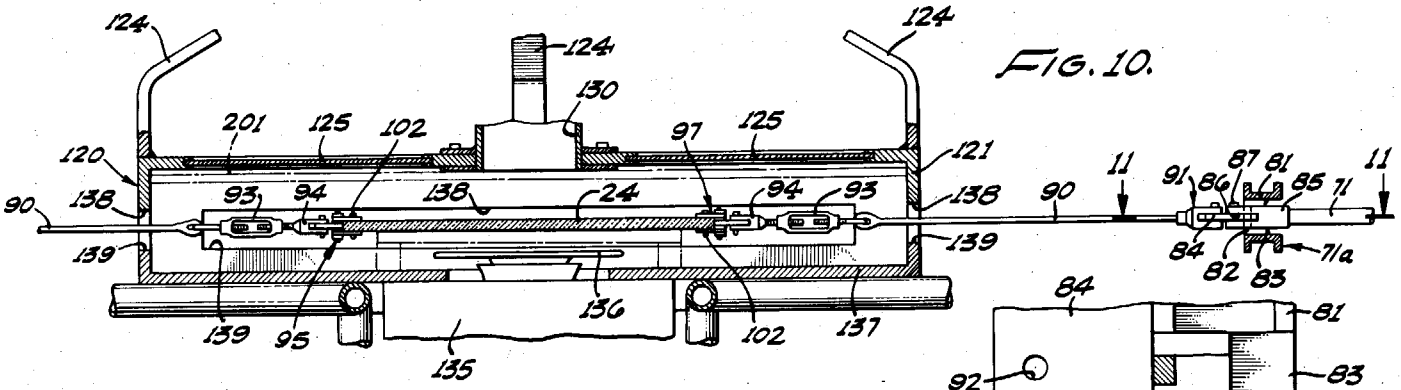
Figure 10 is a sectional view taken substantially on the line 10—10 of Figure 9.
Figure 11:
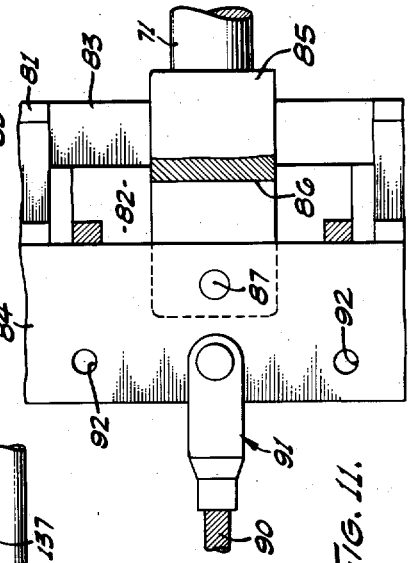
Figure 11 is a sectional view taken substantially on the line 11—11 of Figure 10.
Figure 13:
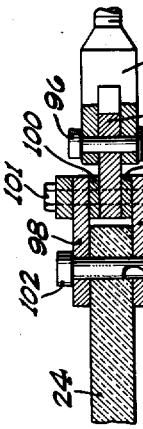
Figure 13 is a sectional elevation taken substantially on the line 13—13 of Figure 12.
Figure 12:
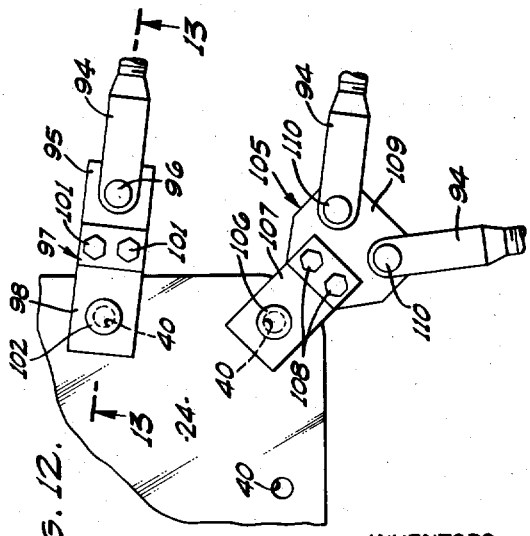
Figure 12 is an enlarged fragmentary view similar to Figure 9, but illustrating the details of the gripping mechanisms.

When the sheet is cooled below its initial shrinking temperature to a rigid condition, the clevis pins 102 and 106 are removed and the sheet is removed from the stretching apparatus as a mechanically stretched sheet, ready for trim and further fabrication into parts. Figures 14–16 illustrate the appearance of a corner area of the stretched sheet. It will be noted that the areas 150 surrounding the grip holes 40, which areas had been maintained at a relatively low temperature during the preheating step, are of substantially the same thickness as the original sheet, not having been stretched. The sheet is trimmed along the phantom lines 151 and 152 to remove these areas. Thermoplastic sheet so stretched has increased resistance to fracture propagation, increased resistance to craze induced either by physical strain or by solvent application, and has a very greatly reduced notch sensitivity as compared to the original cast sheet from which it was stretched.

While the process has been illustrated as applied to the stretching of a rectangular sheet, it is to be understood that the process and apparatus may be adapted to the stretching of any regular polygon, so long as a power cylinder assembly or its equivalent force mechanism is used at each face of the polygon.

The following specific examples are illustrative of the process of the present invention, but it is to be understood that the invention is not to be limited thereto:

EXAMPLE 1

Polymethylmethacrylate sheet (Rohm and Haas' "Plexiglas" II) purchased as ½" thick stock was cut to blank size and its thickness was measured accurately with a micrometer caliper. The cut faces were sanded and the edges and corners were slightly rounded to avoid notches which might initiate fracture during the stretching operation. The blank size was 15" x 24" and it had an average thickness of .478". Three holes, 7/16" in diameter, were drilled on each of the 15" sides with the holes located at 1 5/32" center to edge and 4" center to center. Five additional holes were drilled on the 24" sides with the same edge distance and same center to center distance.

The sheet was located on the oven support frame 25 and clamped in place by inserting the 16 coolant tubes

47 through the pre-drilled sheets and on through the holding clips 51. The sheet and support frame were rolled into the preheating oven 10 which was balanced at 360° F. (±5°). Water at 90° (±2°) was pumped continuously into the coolant inlet manifold 43 throughout the time the part was left in the oven.

The entire stretching apparatus was balanced for 30 minutes at 260° F. by heating with the oven 120. The sheet was removed from the oven 10 after 23 minutes, the coolant tubes disengaged, the stretching oven 120 turned off and its hood 121 raised. The blank was gripped by 16 cables with the clevis pins. The sheet was centered on the stretching equipment and the aft cable attachments were made at 7.35" centers on the spreader bars. In carrying out this example, the sheet was not provided with corner holes and hence the grip assemblies 105 were not utilized.

The hood was dropped back over the sheet and hydraulic line pressure was set at 300 p.s.i. to actuate the four 6" diameter hydraulic pistons. The ram speeds were adjusted at 12" per minute on the 24" dimension and 6" per minute on the 15" dimension. The two cylinders opposing on the 24" dimension worked at 150 p.s.i., and the two cylinders opposing on the 15" sides worked at 115 p.s.i.

The ram stops were set at 100% calculated stretch. Time to stretch was 65 seconds. The line pressure was dropped to 150 p.s.i. after all four cylinders seated home. The sheet was cooled with the blower, removed from the equipment, trimmed and checked with the following results:

A. Percent stretch was calculated based on the fact that the specific gravity of stretched material is the same as that of the cast material. It is therefore assumed that there is no change in specific volume.

On this basis:

$$\text{Percent stretch} = 100\left\{\sqrt{\frac{Ti}{Tf}} - 1\right.$$

Where Ti=initial thickness and Tf=final thickness
Average initial thickness=.478"
Average final thickness=.124"

$$\text{Calculated percent stretch} = 100\left\{\sqrt{\frac{.478}{.124}} - 1\right. = 96\%$$

B. A section of the stretched sheet was cut and carefully measured for length and width. It was then subjected to 350° F. for 30 minutes to allow complete shrinkage to its original thickness.

Based on these values, the following percentages of stretch were determined: 95% stretch in the original 24" direction and 98% in the original 15" direction.

C. Resistance to fracture propagation was measured by the standardized physical test method. The work required to propagate fracture averaged 29 inch lbs. per square inch. The original sheet stock from which this sample was cut required 3¼ inch lbs. per square inch.

D. Resistance to craze was increased.

EXAMPLE 2

The process and apparatus were the same as in Example 1, with the following exceptions:

| | |
|---|---|
| Material | "Plexiglas" 55. |
| Size | .980 x 36" x 36". |
| Oven **10** temperature | 355° F. |
| Time in oven | 100 minutes. |
| Oven **120** temperature | 230° F. |
| Line pressure | 400 p.s.i. for stretching.<br>340 p.s.i. for cooling. |
| Ram speed | 12"/minute. |
| Cylinder pressure | 390 p.s.i. |
| Time for stretch | 60 seconds. |
| Percent stretch | 62½%. |

EXAMPLE 3

The process and apparatus were the same as in Example 1, with the following exceptions:

| | |
|---|---|
| Material | "Plexiglas" II. |
| Size | 1.264 x 15" x 15". |
| Oven **10** temperature | 320° F. |
| Time in oven | 125 minutes. |
| Oven **120** temperature | 230° F. |
| Line pressure, p.s.i. | 500 during stretch.<br>250 when rams reached home.<br>218 during cooling cycle.<br>200 after 5 minute cooling. |
| Ram speed | 6"/minute. |
| Total time of stretch | 55 seconds. |
| Percent stretch | 91½%. |

EXAMPLE 4

The process and apparatus were the same as in Example 1, with the following exceptions:

| | |
|---|---|
| Material | Polymethyl alphachloracrylate ("Gafite," General Aniline & Film Corp.). |
| Size | .515 x 15" x 15". |
| Oven **10** temperature | 375° F. |
| Time in oven | 1 hour. |
| Oven **120** temperature | 280° F. |
| Line pressure | 75 p.s.i.; after 3 minutes, 50 p.s.i. |
| Ram speed | 12"/minute. |
| Total time of stretch | 47 seconds. |
| Water coolers had Homosote shielding on top side, no clips on bottom. | |
| Percent stretch | 86%. |

EXAMPLE 5

Figure 18:
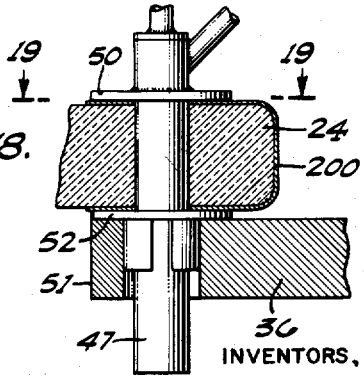
Figure 18 is a fragmentary side elevation illustrating a modified form of cooling means for the gripped portions of the sheet.
Figure 19:
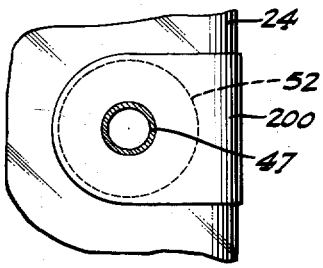
Figure 19 is a sectional view taken substantially on the line 19—19 of Figure 18.

The apparatus used here was the same as in Example 1, with the addition of the modified form of cooling or heat transfer means shown in Figures 18 and 19. This means comprises, in addition to the coolant tubes 47, a sheet of aluminum foil 200 inserted under the flange member 50 and the flange 52 and extending around the edge of the sheet 24. This additional heat transfer means is particularly desirable for use in connection with relatively thick thermoplastic sheet. The process of this example was the same as Example 1, with the following exceptions:

| | |
|---|---|
| Material | "Plexiglas" 55. |
| Size | 1.765 x 36" x 36". |
| Oven **10** temperature | 375° F. |
| Time in oven | 175 minutes. |
| Oven **120** temperature | Apparatus warmed to 200° F. prior to stretch, then oven shut off. |
| Line pressure | 700 p.s.i. for stretch.<br>600 p.s.i. 1" from stop.<br>550 p.s.i. after 3 minute cooling.<br>400 p.s.i. after 8 minute cooling. |
| Ram speed | 12"/minute. |
| Elapsed loading time before stretch | 69 seconds. |
| Total time of stretch | 60 seconds. |
| Percent stretch | 64½%. |

EXAMPLE 6

The apparatus used here was the same as in Example 1, except that the oven 120 was used only to warm the stretching apparatus to about 200° F. prior to insertion of the hot sheet 24 into the stretching apparatus. At this time an aluminum foil-covered board 201 indicated by the phantom lines of Figure 10 was mounted under the top of the hood 121. The board 201 was rectangular in shape and covered the entire underside of the top of the hood, functioning as a heat reflective surface to prevent rapid loss of heat from the sheet 24 during the stretching operation. The process was otherwise the same as that of Example 1, with the following exceptions:

| | |
|---|---|
| Material | "Plexiglas" 55. |
| Size | .979 x 36" x 36". |
| Oven **10** temperature | 375° F. |
| Time in oven | 100 minutes. |
| Line pressure | 500 p.s.i. for stretch.<br>400 p.s.i. 1" from stop.<br>360 p.s.i. after 3 minute cooling. |
| Ram speed | 12"/minute. |
| Elapsed time before stretch | 71 seconds. |
| Total time of stretch | 56 seconds. |
| Percent stretch | 65%. |

Examples 2–6 also differed from Example 1 in that in each case the sheet was provided with corner holes and the grip assemblies 105 were utilized.

EXAMPLE 7

The apparatus used here was the same as in Example 5, with the addition of pressed fiberboard insulating shields ("Homosote") above and below the aluminum foil sheets 200 and in contact therewith, and, with the substitution for the coolant tubes 47, of wooden dowel pins inserted through the clamp holes, the sheets 200 and the "Homosote" shields, to maintain these parts in assembled relation during the heating cycle in the oven 10. During the heating cycle, the stretching apparatus was balanced for 30 minutes at 280° F. with the oven 120, the grip assemblies 97 having been removed and maintained at room temperature. Following the heating cycle, the sheet was removed from the oven 10 and located in the stretching apparatus by means of the grip assemblies 97, with the cool plates 98 and 99 in contact with the corresponding surfaces of the heated sheet. This positive contact between the relatively cool metal plates 98 and 99 and the sheet to be streched is for the purpose of removing heat from the localized areas immediately surrounding the grip holes. It has been found, especially in stretching of thicker sheets and particularly those of "Gafite" material, that this method of removal of heat in the localized areas following the preheating cycle is superior to the previously-described methods of maintaining these areas in a relatively cool condition during the heating cycle. The specific data for this cycle is as follows:

| | |
|---|---|
| Material | Polymethyl alphachloracrylate ("Gafite," General Aniline & Film Corp.). |
| Size | 1.289 x 15" x 15". |
| Oven **10** temperature | 375° F. |
| Time in oven | 80 minutes. |
| Oven **120** temperature | 280° F. |
| Line pressure | 0 p.s.i. for 1 minute.<br>75 p.s.i. to start elongation.<br>125 p.s.i. to continue and complete stretching.<br>100 p.s.i. when rams reach home and for cooling without blower. |
| Ram speed | 3"/minute. |
| Total time of stretch | 4 min. 25 sec. |
| Percent stretch | 93%. |

The process of the present invention has been carried out without the use of the oven 10. In so doing, the cold plastic sheet is placed directly in the stretching apparatus and the areas surrounding the grip holes 40 are covered with sheets of aluminum foil similar to the sheets 200. The plastic sheet is them heated by the infra-red heaters of the oven 120 to the stretching temperature, the aluminum foil sheets providing shielding means maintaining the gripping areas sufficiently cool, i.e., below the stretching temperature, to permit the stretching operation to then be carried out as described above.

Transparent sheets stretched in accordance with this invention find particular usefulness in aircraft glazing applications but there are, of course, many other uses for transparent, opaque or translucent stretched sheet.

It will be understood from the above description that the sheets are multi-directionally stretched, the stretching forces being applied in the plane of the sheet to stretch the sheet in a plurality of directions.

Having fully described our invention, it is to be understood that we do not wish to be limited to the details set forth, but our invention is of the full scope of the appended claims.

We claim:

1. In a process for multidirectionally stretching thermoplastic sheet material, the steps comprising heating the main body of a thermoplastic sheet to a *temperature within the* forming temperature *range,* maintaining spaced portions of said sheet adjacent the edges thereof and extending around the entire periphery thereof *cooled* at a temperature below said forming temperature *range,* the portions of said sheet adjacent the edges and between said *cooled,* spaced portions being heated to *a temperature within the* [said] forming temperature *range,* gripping the sheet at said *cooled,* spaced portions, and *then,* while said main body is in the heated condition *and the spaced portions are maintained at a temperature below the forming temperature range,* applying forces to said *cooled,* spaced portions along lines in the plane of said sheet to stretch the same in a plurality of directions.

2. In a process for multidirectionally stretching thermoplastic sheet material, the steps comprising heating the main body of a thermoplastic sheet to a *temperature within the* forming temperature *range,* cooling spaced portions of said sheet adjacent the edges thereof and extending around the entire periphery thereof to a temperature below said [spaced] forming temperature *range,* the portions of said sheet adjacent the edges and between said *cooled,* spaced portions being heated to *a temperture within the* [said] forming temperature *range,* gripping the sheet at said *cooled, spaced* portions, and *then,* while said main body is in the heated condition *and said spaced portions are in the cooled condition,* applying forces to said *cooled,* spaced portions along lines in the plane of said sheet and substantially perpendicular to the edges thereof to stretch the same in a plurality of directions.

3. In a process for multidirectionally stretching thermoplastic sheet material, the steps comprising heating the main body of a rectangular thermoplastic sheet to a *temperature within the* forming temperature *range,* cooling spaced portions of said sheet adjacent the edges thereof and extending around the entire periphery thereof with a heat exchange medium to maintain said spaced portions at a temperature below said forming temperature *range,* the portions of said sheet adjacent the edges and between said *cooled,* spaced portions being heated to *a temperature within the* [said] forming temperature range, said *cooled,* spaced portions including corner portions, gripping the sheet at said *cooled,* spaced portions, and *then,* while said main body is in the heated condition *and said spaced portions are in the cooled condition,* applying forces to said *cooled,* corner portions along lines in the plane of said sheet and substantially diagonally of the sheet, and applying forces to the other *cooled,* spaced portions along lines in the plane of the sheet and substantially perpendicular to the edges thereof to stretch the sheet in a plurality of directions.

4. In a process for multidirectionally stretching thermoplastic sheet material, the steps comprising providing a plurality of spaced holes in said sheet adjacent the edges thereof and extending around the entire periphery thereof, heating the main body of said sheet to a *temperature within the* forming temperature *range* while maintaining the portions of said sheet surrounding said holes at a temperature below said forming temperature *range,* the portions of said sheet adjacent the edges and between said surrounding portions being heated to *a temperature within the* [said] forming temperature *range,* inserting gripping means in said holes, and *then,* while said main body is in the heated condition *and said surrounding portions are maintained at a temperature below the forming temperature range,* applying forces to said gripping means in the plane of said sheet to stretch the same in a plurality of directions.

5. In apparatus for multidirectionally stretching thermoplastic sheet material, the combination of means for heating the main body of a thermoplastic sheet to a *temperature within the* forming temperature *range,* means for maintaining spaced portions of said sheet adjacent the edges thereof and extending around the entire periphery thereof *cooled* at a temperature below said forming temperature *range* while the portions of said sheet adjacent the edges and between said *cooled,* spaced portions are heated to *a temperature within the* [said] forming temperature *range,* means for gripping the sheet at said *cooled,* spaced portions, and means for *then* applying forces to said *cooled,* spaced portions along lines in the plane of said sheet in a plurality of directions to stretch the same, said force applying means including a plurality of cables, one attached to each of said gripping means.

6. In apparatus for stretching thermoplastic sheet material, the combination of an oven, a support frame positioned in said oven, said frame including means for supporting a sheet of thermoplastic material, a plurality of heat exchange assemblies on said frame, means for attaching said assemblies to said sheet at spaced portions adjacent the edges thereof, said assemblies each including a coolant tube insertable in holes in said sheet, and means for circulating a heat exchange fluid through said tubes.

References Cited in the file of this patent or the original patent

UNITED STATES PATENTS

| | | |
|---|---|---|
| 2,297,645 | Bailey | Sept. 29, 1942 |
| 2,618,012 | Milne | Nov. 18, 1952 |
| 2,646,647 | Bamford et al. | July 28, 1953 |
| 2,671,987 | Jendrisak | Mar. 16, 1954 |
| 2,717,766 | Becker | Sept. 13, 1955 |
| 2,723,108 | Butler et al. | Nov. 8, 1955 |
| 2,749,572 | Nowak | June 12, 1956 |
| 2,759,217 | Peterson | Aug. 21, 1956 |
| 2,770,007 | Longstreth et al. | Nov. 13, 1956 |
| 2,779,053 | Longstreth et al. | Jan. 29, 1957 |

FOREIGN PATENTS

| | | |
|---|---|---|
| 786,370 | France | June 8, 1935 |